(No Model.)

J. L. JÖNSSON.
MILK HEATER.

No. 447,073. Patented Feb. 24, 1891.

Witnesses:
Emil Neuhart
Jacob Aussenblatt

Johan Ludvig Jönsson Inventor:
By Edward Wilhelm
Attorney.

UNITED STATES PATENT OFFICE.

JOHAN LUDVIG JÖNSSON, OF STOCKHOLM, SWEDEN, ASSIGNOR TO THE AKTIEBOLAGET SEPARATOR, OF SAME PLACE.

MILK-HEATER.

SPECIFICATION forming part of Letters Patent No. 447,073, dated February 24, 1891.

Application filed May 12, 1890. Serial No. 351,379. (No model.) Patented in Sweden December 21, 1887, No. 1,373; in England March 4, 1888, No. 3,976, and in Germany October 3, 1888, No. 44,817.

*To all whom it may concern:*

Be it known that I, JOHAN LUDVIG JÖNSSON, a citizen of the Kingdom of Sweden, residing at the city of Stockholm, Sweden, have invented certain new and useful Improvements in Milk-Heaters, (for which patents have been obtained in Great Britain, No. 3,976, dated March 4, 1888; in Sweden, No. 1,373, dated December 21, 1887, and in Germany, No. 44,817, dated October 3, 1888,) of which the following is a specification.

This invention relates to that class of devices whereby the milk is heated to the proper temperature, usually about 85° Fahrenheit, preparatory to feeding it to a centrifugal separator, in which the cream is separated from the milk.

The object of my invention is to produce a simple and compact device by which the milk is heated quickly to the desired temperature with a small expenditure of steam and without danger of overheating.

Figure 1:
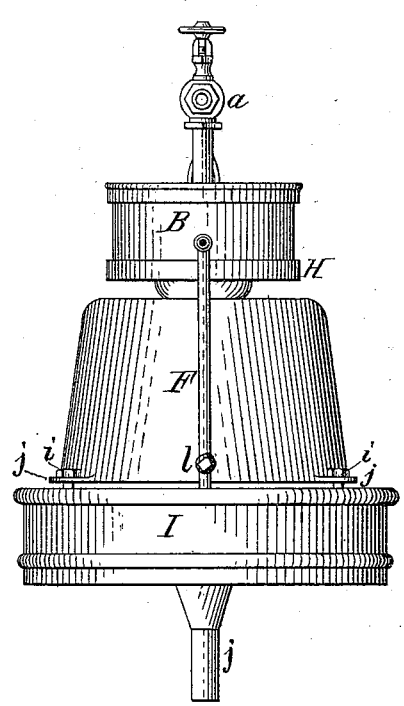
Figure 2:
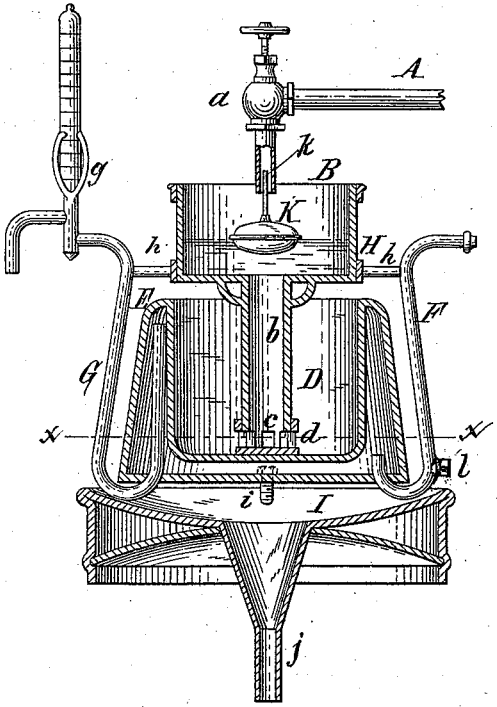
Figure 3:
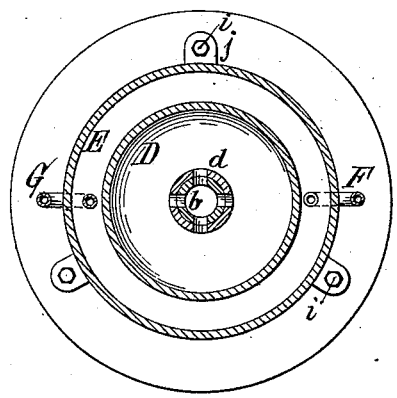

In the accompanying drawings, Figure 1 is a side elevation of my improved milk-heater. Fig. 2 is a sectional elevation of the same. Fig. 3 is a horizontal section in line $xx$, Fig. 2.

Like letters of reference refer to like parts in the several figures.

A represents the pipe through which the milk escapes from the milk-vat or other receptacle and which is provided with a stop-cock $a$.

B represents a feed-cup arranged underneath the pipe A and receiving the milk therefrom. This feed-cup is provided in its bottom with a central vertical discharge or feed pipe $b$, having at its lower end slots or notches $c$, through which the milk escapes therefrom.

D represents a jacketed heating-vessel which surrounds the feed-pipe $b$, and which is provided on its bottom with a slotted collar $d$, in which the lower end of this pipe fits snugly. The slots in the collar and in the lower end of the pipe are of the same size, and the portions of the metal between the slots are of slightly greater width than the slots, so that by turning the feed cup and pipe the slots can be fully or partially opened or closed, as may be desired.

The heater D is open at the top and has its sides and bottom surrounded by a water-jacket E.

F is a steam-supply pipe, which enters the lower portion of the water-jacket on one side of the heater, and G is an overflow-pipe which communicates with the upper portion of the water-space at the opposite side, extends downwardly through the bottom of the water-jacket, and then ascends on the outer side of the jacket above the top thereof, where it is provided with a socket $g$ for the reception of a thermometer.

H is an annular supporting-frame, which surrounds the lower portion of the feed-cup and is secured to the pipes F and G by arms $h$. The overflow-pipe G forms a trap, which retains a sufficient body of water to prevent the steam from escaping from the water-jacket.

I is a circular pan or base arranged below the jacketed heater, which latter is supported on this pan by leveling-screws $i$, arranged in lugs $j$ on the heater. The pan is somewhat larger in diameter than the water-jacket of the heater, so as to receive the milk therefrom. It is provided at the middle with a discharge-pipe $j$, which delivers the heated milk to the centrifugal creamer, and this pipe branches off into two or more discharge-pipes when one heater is used for heating the milk for two or more separators.

K represents a hollow metallic float, which is arranged in the feed-cup and provided on its upper side with a stem $k$, which enters the milk-supply pipe and prevents lateral displacement of the float. As the level of the milk rises in the feed-cup it lifts the float toward the mouth of the milk-supply pipe. The float in rising reduces the milk-supply and finally shuts it off entirely before the level of the milk rises to the top of the feed-cup, thereby preventing overflow of the milk from the feed-cup when the escape of the milk from the lower end of the feed-pipe is restricted.

The milk passing from the feed-pipe into the heater fills the same, flows over the top rim of the heater and down over the outer side of the water-jacket, and escapes into the pan I. The water in the jacket surrounding the heater is heated by steam entering through the pipe F, and the excess of water resulting from condensation is discharged through the pipe G. The milk becomes heated by contact with the inner wall of the heater and also by contact with the outer wall of the water-jacket and reaches the pan at the proper temperature for creaming, which temperature is easily regulated by observing the temperature of the overflow. The water-jacket is filled and emptied through an opening in the lower portion of the steam-pipe, which is closed by a screw *l*. The steam is let on very gently, and when the overflow shows a temperature of from 85° to 100° Fahrenheit and the separator has attained full speed the milk is let in. The pan is set upon the top casing of the separator and the heater is leveled upon the pan by the adjusting-screws, so that the milk flows evenly over the top edge of the heater.

The milk is aerated and deprived of the animal odor in passing in a thin film over the outer surface of the heating-vessel. As the feed-pipe rests loosely in the slotted collar and the heating-vessel rests loosely on the receiving-pan, the heater is readily taken apart for cleaning and put together again for use.

I claim as my invention—

1. The combination, with a heating-vessel provided with a surrounding heating-jacket and having an open top, over which the liquid passes from the vessel upon the outer surface of the heating-jacket, of a feeder which delivers the liquid to be heated into the vessel, whereby the liquid which has become heated in the vessel is further heated in flowing over the outer surface of the heating-jacket, substantially as set forth.

2. The combination, with a heating-vessel provided with a surrounding heating-jacket and having an open top, over which the liquid passes from the vessel upon the outer surface of the heating-jacket, of a collar arranged with its closed bottom on the bottom of the heating-vessel and provided with slots in its side, and a slotted feed-pipe entering said collar, whereby the admission of the liquid to the vessel and its flow over the outer surface can be regulated by turning the feed-pipe in said collar, substantially as set forth.

3. The combination, with the jacketed heating-vessel having an open top, over which the liquid flows upon the outer surface of the vessel, and provided with a slotted collar on its bottom, of a removable feed-cup provided with a slotted pipe, which rests loosely in said slotted collar, and a receiving-pan upon which the jacketed vessel rests loosely, substantially as set forth.

4. The combination, with the heating-vessel having its sides and bottom surrounded by a water-jacket, of a steam-supply pipe connected with said jacket, and an overflow-pipe opening in the upper portion of the water-space, descending through the bottom of the jacket, and ascending outside of the same, substantially as set forth.

In testimony that I claim the foregoing as my invention I have signed my name, in presence of two witnesses, this 13th day of February, 1890.

JOHAN LUDVIG JÖNSSON.

Witnesses:
STEN ERICSSON,
E. F. HAASE.